(12) United States Patent
Johnson, Sr. et al.

(10) Patent No.: US 9,958,759 B2
(45) Date of Patent: May 1, 2018

(54) ADAPTABLE CAMERA SUPPORT

(71) Applicant: Really Right Stuff, LLC, San Luis Obispo, CA (US)

(72) Inventors: Joseph M. Johnson, Sr., San Luis Obispo, CA (US); Joseph M. Johnson, Jr., San Luis Obispo, CA (US)

(73) Assignee: Really Right Stuff, LLC, San Luis Obispo, CA (US)

( * ) Notice: Subject to any disclaimer, the term of this patent is extended or adjusted under 35 U.S.C. 154(b) by 0 days. days.

(21) Appl. No.: 13/788,480

(22) Filed: Mar. 7, 2013

(65) Prior Publication Data

US 2013/0233988 A1    Sep. 12, 2013

Related U.S. Application Data

(60) Provisional application No. 61/608,365, filed on Mar. 8, 2012.

(51) Int. Cl.
| | |
|---|---|
| *F16M 11/20* | (2006.01) |
| *G03B 17/56* | (2006.01) |
| *F16C 11/06* | (2006.01) |
| *F16M 11/14* | (2006.01) |
| *F16M 11/10* | (2006.01) |
| *F16M 11/12* | (2006.01) |
| *F16M 11/28* | (2006.01) |
| *F16M 13/02* | (2006.01) |
| *F16B 2/10* | (2006.01) |

(52) U.S. Cl.
CPC ............ *G03B 17/561* (2013.01); *F16C 11/06* (2013.01); *F16M 11/10* (2013.01); *F16M 11/123* (2013.01); *F16M 11/14* (2013.01); *F16M 11/2078* (2013.01); *F16M 11/28* (2013.01); *F16M 13/022* (2013.01); *F16B 2/10* (2013.01); *F16M 2200/022* (2013.01); *Y10T 403/32311* (2015.01)

(58) Field of Classification Search
CPC .......... G03B 17/561; F16C 11/06; F16B 2/02; F16M 11/10; F16M 11/14; F16M 11/207
USPC ..... 248/181.1, 181.2, 229.1, 229.14, 229.11, 248/230.1, 230.5, 231.61, 231.85, 231.21, 248/227.3, 227.4, 288.31, 288.51, 176.1, 248/309.1; 396/12, 336, 347, 419, 422, 396/42; 403/76, 90, 114, 115, 122, 131
See application file for complete search history.

(56) References Cited

U.S. PATENT DOCUMENTS

| | | | | |
|---|---|---|---|---|
| 1,688,148 | A * | 10/1928 | Martin | B60Q 7/00 211/86.01 |
| 2,128,046 | A * | 8/1938 | Hell | A47B 11/00 108/6 |
| 2,752,116 | A * | 6/1956 | Minnis | F16M 11/14 248/181.1 |

(Continued)

*Primary Examiner* — Muhammad Ijaz
(74) *Attorney, Agent, or Firm* — Chernoff Vilhauer, LLC

(57) ABSTRACT

An adaptable camera support includes a quick disconnect, panning ball clamp connectable to an adjustable clamp. The relative angularity and separation of the jaws of the adjustable clamp are independently variable to engage articles of widely varying size and shape. The quick disconnect panning ball clamp includes a rotatable panning base and a ball element rotatable on axes at an angle to the axis of rotation of the panning base. Hinged ball clamp housing sections enable rapid releasing and securing of the ball element and an article attached to the ball element.

7 Claims, 4 Drawing Sheets

(56) References Cited

U.S. PATENT DOCUMENTS

| | | | | |
|---|---|---|---|---|
| 2,862,730 A * | 12/1958 | Berger | | F21V 21/26 285/153.3 |
| 3,389,927 A * | 6/1968 | Herbenar | | F16C 11/0633 403/128 |
| 3,632,073 A * | 1/1972 | Nakatani | | F16M 11/14 248/169 |
| 4,320,884 A * | 3/1982 | Leo | | F16M 11/14 248/181.1 |
| 5,383,738 A * | 1/1995 | Herbermann | | B25J 9/06 248/288.51 |
| 6,220,556 B1 * | 4/2001 | Sohrt | | F16C 11/106 248/278.1 |
| 6,820,849 B2 * | 11/2004 | Kennard | | F21V 21/088 248/231.61 |
| 7,320,450 B2 * | 1/2008 | Carnevali | | F16M 11/40 248/121 |
| 7,812,237 B1 * | 10/2010 | Dunnett | | G10D 13/006 84/422.1 |
| 7,926,774 B1 * | 4/2011 | Wilson | | F16M 13/00 248/181.1 |
| 7,959,120 B2 * | 6/2011 | Liao | | B60R 11/0252 248/122.1 |
| 8,025,262 B2 * | 9/2011 | Yamaguchi | | F16M 11/14 248/176.1 |
| 2003/0080267 A1 * | 5/2003 | Eslick | | F16B 2/065 248/229.1 |
| 2005/0263656 A1 * | 12/2005 | Chen | | G10H 3/146 248/229.14 |
| 2006/0000957 A1 * | 1/2006 | Carnevali | | F16M 11/14 248/181.1 |
| 2007/0152116 A1 * | 7/2007 | Madsen | | F16M 11/14 248/181.1 |
| 2008/0061197 A1 * | 3/2008 | Carnevali | | F16M 11/14 248/181.1 |
| 2008/0203255 A1 * | 8/2008 | Workman | | B25B 5/003 248/231.61 |
| 2008/0267613 A1 * | 10/2008 | Darrow | | F16M 11/041 396/428 |
| 2008/0296334 A1 * | 12/2008 | Carnevali | | B60R 11/0241 224/558 |
| 2011/0020055 A1 * | 1/2011 | Kallas | | F16M 11/14 403/115 |
| 2013/0114951 A1 * | 5/2013 | Darrow | | F16M 11/041 396/428 |

* cited by examiner

ADAPTABLE CAMERA SUPPORT

CROSS-REFERENCE TO RELATED APPLICATIONS

This application claims the benefit of Provisional App. No. 61/608,365, filed Mar. 8, 2012.

BACKGROUND OF THE INVENTION

The present invention relates to an apparatus for securing an article to a structure and, more particularly, to an adaptable apparatus facilitating rapid attachment and separation of an optical instrument and a structure.

Mechanically supporting a camera, binoculars, telescope or other optical instrument can substantially improve the instrument's performance. This is particularly true when photographing with a long exposure time or using a heavy telephoto lens where even slight movement can cause blurring of the image. A tripod provides steady mechanical support for a camera, binoculars, telescope or other optical instrument but a tripod can be cumbersome and difficult to use. On the other hand, a monopod provides better control of the instrument than handholding, particularly when using long, heavy telephoto lenses and is typically lighter, smaller and more portable than a tripod. The freedom of movement offered by a monopod's single point of support also makes it easier to pan shots and visually acquire a moving target. The combination of mobility and stability offered by a monopod often makes the monopod the support of choice for optical instruments used in the field, for examples, cameras used by wildlife and sports photographers.

Support for an instrument can be further improved by securing the camera or other instrument to a structure if one is available. For example, when photographing in a game park, securing an instrument with an attached monopod to a portion of the vehicle may provide stability approaching that provided by a tripod. However, securing an instrument to a vehicle or other structure can be complicated because the arrangement of structural elements providing potential attachment points varies. In addition, securing an instrument, such as a camera, to a vehicle adversely affects the instrument's mobility and it is often desirable or necessary to the move the instrument so that it can be used in a different location either within or outside of the vehicle. Time is often of the essence in photography and other uses of optical instruments and the time and effort required to attach and separate the instrument and the structure adversely affects the mobility and convenience of a handheld or monopod mounted instrument.

What is desired, therefore, an adaptable apparatus for securing an optical instrument to a structure that facilitates rapid attachment and separation of the instrument and the structure.

BRIEF SUMMARY OF THE INVENTION

The present invention relates to an adaptable camera support that may include a quick disconnect, panning ball clamp connectable to an adjustable clamp. The relative angularity and separation of jaws of the adjustable clamp may be independently variable to engage articles of widely varying size and shape. The quick disconnect panning ball clamp may include a rotatable panning base and a ball element. A hinged ball clamp housing sections may enable rapid releasing and securing of the ball element for or to an article attached to the ball element.

DETAILED DESCRIPTION OF PREFERRED EMBODIMENTS

Figure 1:
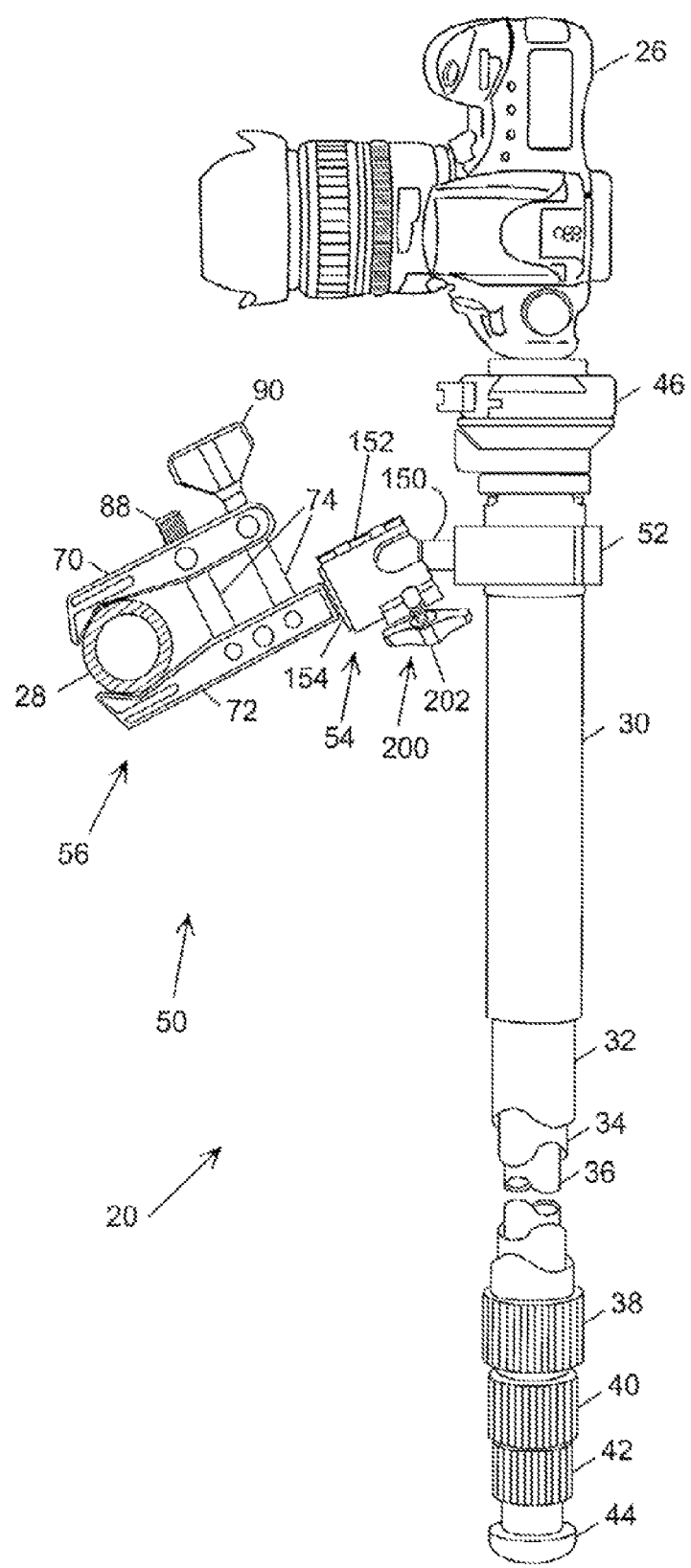
FIG. 1 is an elevation view of an apparatus for securing an optical instrument to a structure.

Referring in detail to the drawings where similar parts are identified by like reference numerals, and, more particularly to FIG. 1, when touring a game preserve or otherwise utilizing a camera 26 or other optical instrument in a vehicle, it is often desirable to secure the camera or other instrument to a portion of the vehicle's structure 28 with the instrument attached to a monopod 30. Fixing a camera 26 or other instrument to a vehicle stabilizes the camera, but securing an assembly 20 comprising a monopod and camera (or other instrument) to the vehicle is particularly advantageous because it is often desirable to move the instrument to a different location within the vehicle for use or to use the instrument when dismounted from the vehicle. Steadying a camera 26 or other instrument with a monopod reduces vertical shaking of the instrument, sharpens the image, allows slower shutter speeds and reduces small random movements in video. An apparatus for securing a camera or other optical instrument to a structure preferably is adaptable to enable attachment to structural elements having a variety of shapes and sizes and in varying arrangements and preferably provides rapid and easy separation and attachment of the instrument and the structure 28 to facilitate use when time is of the essence.

A monopod 30, sometimes called a unipod, is an elongate, single pole commonly used to help support an optical instrument such as a camera 26, telescope or binoculars. Monopods commonly comprise multiple folding sections or, as illustrated, telescoping tubular sections 32, 34, 36 that slide within each other to enable the extension of the monopod from a retracted length facilitating transportation and storage to a length useful for a standing user of the attached optical instrument. Movement of the various telescoping sections of a monopod is commonly controlled by twist locks 38, 40, 42 which are rotatable to release the sections for relative movement and to restrain relative movement of the telescoping sections. The exemplary monopod 30 is equipped with a foot 44 that resists slippage on the supporting surface.

A camera or other instrument can be mounted directly on a monopod but to enable acquisition of a desired image, the monopod typically must either be moved or tilted to reorient the instrument's optical axis or the camera's image capturing device. The exemplary camera 26 is a mounted on a leveling base 46 which is attached to the monopod 30. The leveling base allows tilting of the camera so that the base of the camera may be kept horizontal when the monopod is tilted for visually acquiring the photographic subject. On the other hand, the interface between the camera and the monopod might be a ball head or a gimbal head.

The exemplary monopod-camera assembly 20 is secured to the structural element 28 by an exemplary adaptable securing apparatus 50 comprising a monopod collar 52, a quick-disconnect ball clamp 54 and an adjustable clamp 56.

Figure 2:
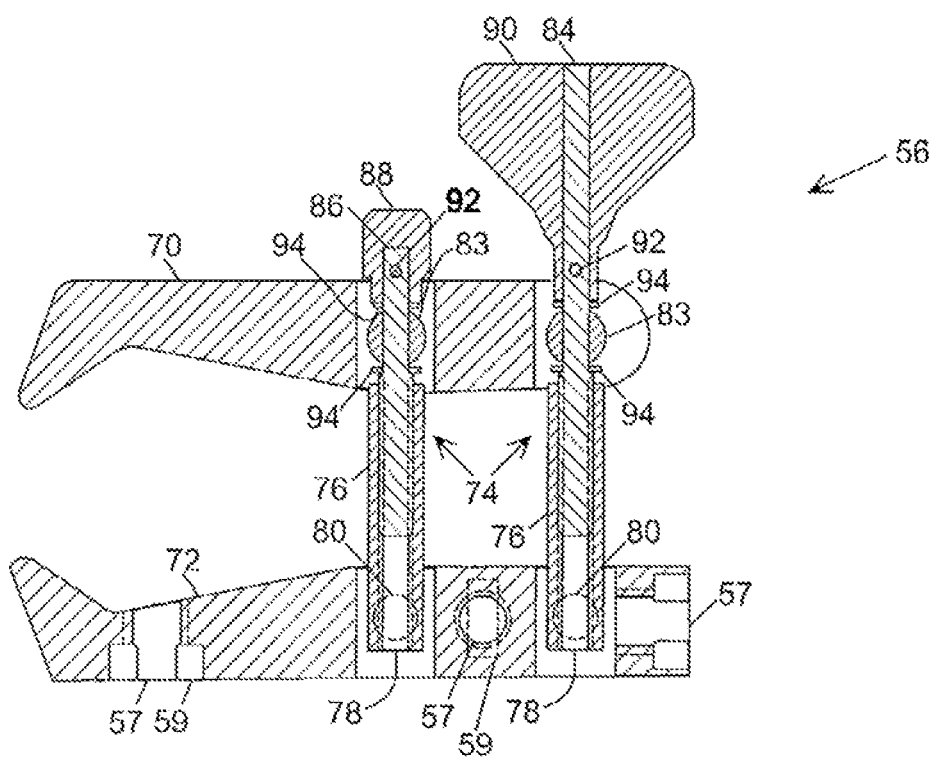
FIG. 2 is a cutaway view of an adjustable clamp for securing an optical instrument to a structure.
Figure 3:
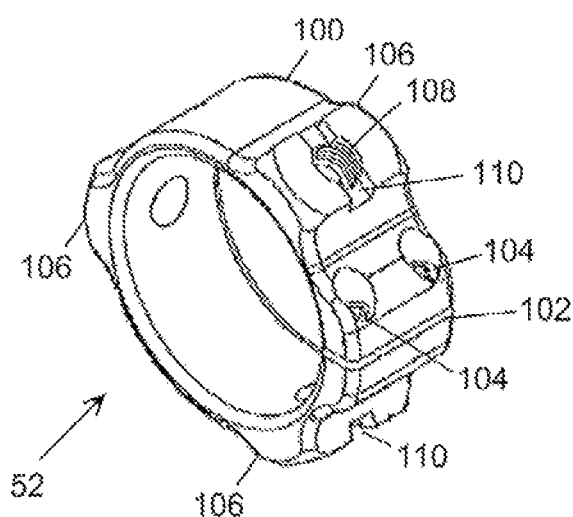
FIG. 3 is a perspective view of a monopod collar.
Figure 4:
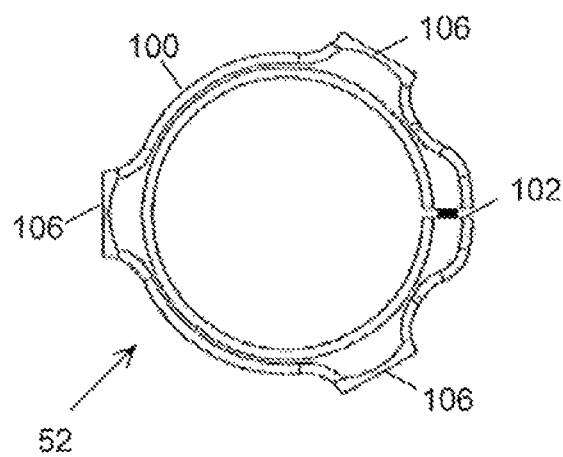
FIG. 4 is a plan view of the monopod collar of FIG. 3.

Referring also to FIG. 2, the adjustable clamp 56 comprises plural jaws 70, 72 connected by a pair of screw assemblies 74. Each screw assembly comprises an elongate tube 76 having a threaded central aperture 78. Each tube 76 is connected to one of the clamp jaws 70, 72 by a trunnion 80 that restrains the tube in the direction of the tube's longitudinal axis but permits the tube to pivot relative to the clamp jaw. Similarly, trunnions 83 engaging the second jaw 70 permit the angular relationship of the clamp jaw and the respective screws 84, 86 to vary. A knob 88 and a wing nut 90 engage the respective screws 86, 84 and each is constrained to rotate the screw by a pin 92 passing diametrically through the screw and the body of the knob or wing nut. The knob or the wing nut, respectively, and shoulders on the screws bear on thrust washers 94 which, in turn, bear of the trunnions 83. The thrust washers ease rotation of the screws 84, 86 each of which is in threaded engagement with a respective tube 76. By rotating the individual screws 84, 86, a user can change the angular relationship and the distance between the jaws 70, 72 of the adjustable clamp 56 to enable engaging and securing structural elements of widely varying shape and size.

While other elements, for example an adjustable clamp 56, could be used for connecting an optical instrument or a monopod to the quick disconnect ball clamp 54, the monopod collar 52 of the exemplary apparatus of FIG. 1 provides a convenient anchoring element for use with a monopod 30. The monopod collar 52 comprises a resilient collar 100 which defines a slit 102 enabling expansion of the collar's diameter when sliding the collar on to the monopod and contraction of the collar's diameter when securing the collar on the monopod. Each of a pair of screws 104 includes portions engaging the collar 100 on either side of the slit 102. Tightening the screws 104 decreases the diameter of the collar to secure the collar to the monopod. The collar 100 includes plural bosses 106 each defining a threaded aperture 108 to receive a screw. Each boss 106 also defines a groove 110 extending outward from opposing sides of the threaded aperture.

Figure 5:
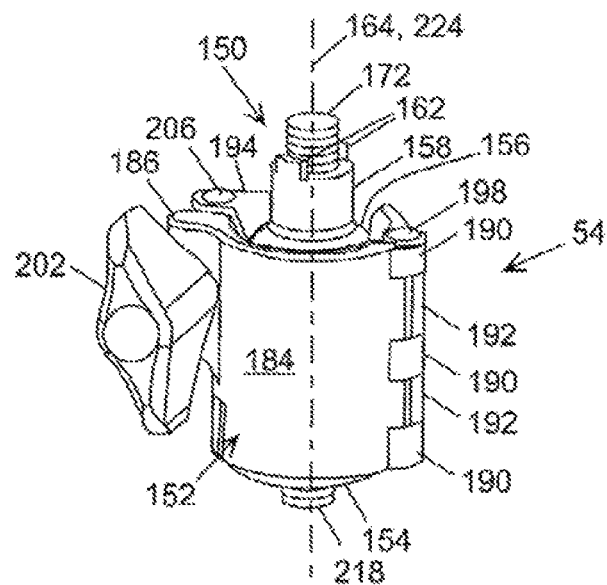
FIG. 5 is a perspective view of a quick-disconnect, panning ball clamp.
Figure 6:
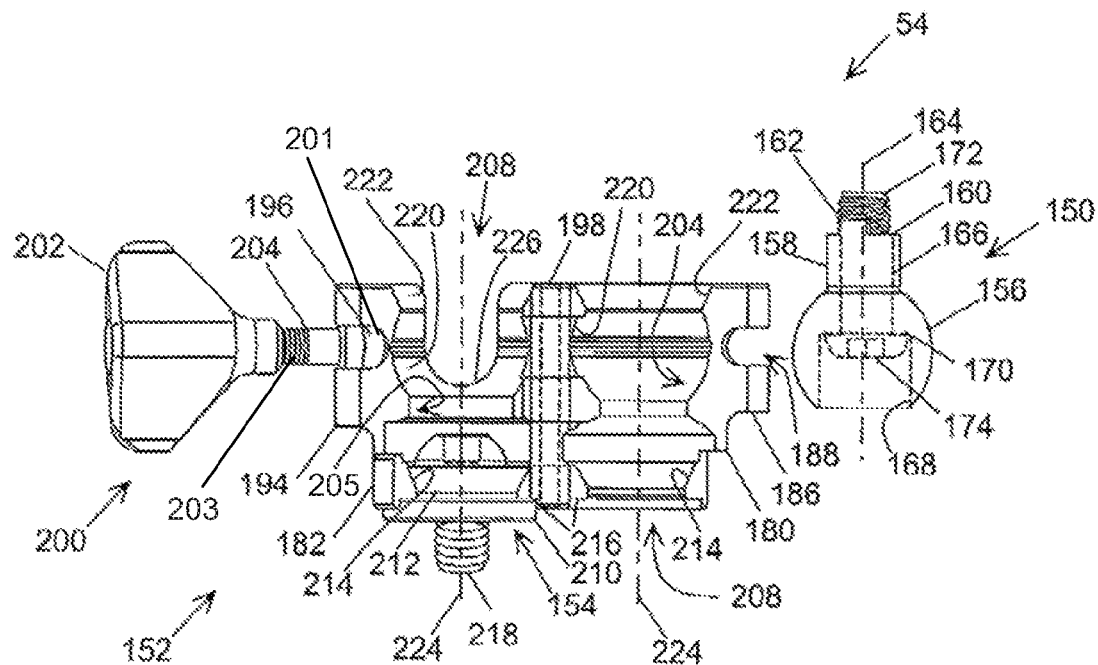
FIG. 6 is an elevation view of the quick-disconnect, panning ball clamp of FIG. 5 illustrating separation of the ball element from the open housing.

Referring also to FIGS. 5 and 6, the quick disconnect, panning ball clamp 54 comprises, generally, a ball element 150, a housing 152 and a panning base 154. The ball element 150 comprises an ellipsoid first ball portion 156 which is preferably generally spherical, but which could be elliptical or any other suitable shape. A neck portion 158 extends from the ellipsoid first ball portion 156. The neck portion 158 is preferably cylindrical in cross-section and has a surface 160 distal of the neck's intersection with the first ball portion 156 that preferably defines, at least, one tab 162 projecting substantially parallel to the longitudinal axis 164 of the neck portion 158. The ball element 150 defines plural concentric apertures 166, 168 extending through the first ball portion and along the longitudinal axis 164 of the neck portion 158 and forming a shoulder 170 at their intersection. The ball element 150 can be attached to another article by engaging a screw 172 inserted into the apertures 166, 168 in the ball element with complementary screw threads in the other article and tightening the screw to secure the article to the end of the neck portion 158. For example, in FIG. 1, the ball element 150 is secured to the monopod collar 52 by threading the screw in the ball element into one of the threaded apertures 108 in the collar. The tab 162 projecting from the end of the neck portion 158 of the ball element 150 is arranged to engage a slot, such as the slot 110 in the surface of the boss 106 on the collar 54, to prevent rotation of the ball element relative to the article to which it is attached and loosening of the screw 172. Similarly, the adjustable clamp includes a recess 59 extending outward from the threaded aperture 57 to receive a tab 162 on a ball element. Preferably, the head of the screw 172 defines a wrench cavity 174 enabling a user to engage and tighten the screw with a wrench.

While the housing of the quick disconnect ball clamp could have any external shape, the housing 152 of the exemplary ball clamp 54 is generally cylindrical and comprises a first housing segment 180 and a second housing segment 182 hingedly connected to the first housing segment. The first 180 and second 182 housing segments each comprise a wall defining a respective outer surface and a respective inner surface. The wall of the first housing segment 180 comprises a curved outer surface portion 184, an ear portion 186 projecting generally radially from the outer surface at one end of the curved surface portion and defining a slot 188, and a hinge portion defining plural hinge knuckles 190 at the opposite end of the curved surface portion. The wall of the second housing segment 182 also defines a curved outer surface portion, a hinge portion defining plural hinge knuckles 192 complementary to the hinge knuckles 190 of the first housing segment 180, and a latch anchoring portion 194 projecting roughly radially relative to the curved outer surface portion and defining a slot 196 and an aperture for receiving a latch retaining pin 206. The hinge knuckles 190 and 192 of the first 180 and second 182 housing segments define, respectively, hinge pin apertures which receive a hinge pin 198.

When the first 180 and second 182 housing segments are pivoted toward each other about the hinged connection, the housing segments can be secured to each other in a "closed" position by a latch 200. The latch 200 comprises a wing nut 202, a threaded eye bolt 204, a first end 201, a middle portion 203, and a retaining pin 206 fixedly inserted through the eye of the eye bolt and the retaining pin apertures in the latch anchoring portion 194 of the housing segment. The retaining pin 206 allows the eye bolt 204 to pivot so that the stem of the eye bolt can enter the slot 188 in the first housing segment 180 positioning the wing nut 202 to bear against the ear portion 186 of the housing segment. Tightening the wing nut 202 secures the first housing segment 180 and second housing segment 180 in the closed position.

When the first 180 and second 182 housing segments are pivoted together to the closed position, the inner surfaces 204, 205 of the respective housing segments define an elongate aperture 208 extending through the housing. The surface 204, 205 of the aperture 208 defines a plurality of spaces of varying shapes and sizes to accommodate the ball element 150 and a panning base 154. The panning base 154 is generally circular in cross-section and comprises a cylindrical portion 210 and a frustoconical portion 212. The panning base 154 is arranged in the housing's aperture 208 for rotation on an axis parallel to the axis 224 of the housing aperture 208 and is restrained in the direction of the aperture's longitudinal axis 224 by contact between the conical surface of the frustoconical portion 212 of the panning base and a complementary angled portion 214 of the aperture's surface and by contact between the upper surface of the cylindrical portion 210 of the panning base and a shoulder surface portion 216 of the housing segments 180, 182. A screw 218 passing through a central aperture in the panning base 154 enables attachment of the panning base to another article having a corresponding aperture with complimentary threads. For example, the adjustable clamp 56 includes plural threaded apertures 57 at different locations on at least one of the clamp jaws 72 enabling attachment of the panning base 154 or the ball element 150 in several positions and orientations relative to the elements of the clamp's structure. A recess 59 extending outward from the aperture 57 is engageable with a tab or key on the attached article to prevent rotation of the article.

The inner surfaces 204, 205 of the first 180 and second 182 housing segments include surface portions 220 defining, in the closed position, an ellipsoid socket portion conforming generally to the shape of the ellipsoid first ball portion 156 and a second generally frustoconical space defined by angled surfaces 222. The ball element 150 is rotatably retained within the body of the ball clamp 152 by locating the ellipsoid first ball portion 156 of the ball element within the socket portion formed by the inner surfaces 220 the housing segments. With the neck portion of the ball projecting from the end of the housing opposite of the panning base 154, the second generally frustoconical space defined by angled surfaces 222 provides clearance for the neck portion 158 of the ball element permitting rotation of the ball element on axes which not parallel to the longitudinal axis 224 of the housing aperture and the rotational axis of the panning base 154. By rotating the ball element 150 to an axis not parallel to the axis of the housing aperture, the screw 172 in the ball element 150 can be aligned for engagement with a non-axial threaded aperture in another article. In addition, one of the housing segments 182 defines a drop notch 226 for receiving the neck portion 158 of the ball element 150 enabling rotation of the ball element until the longitudinal axis 164 of the neck portion is substantially normal to the longitudinal axis 174 of the housing aperture 208.

The quick disconnect, panning ball clamp 54 and the adjustable clamp 56 provide an adaptable apparatus 50 for securing an optical instrument, such as a camera, to a structural element 28, such as a part of a vehicle or other article. By manipulating the respective screw assemblies 74 of the adjustable clamp 56 the angular relationship and the distance between the jaws 70, 72 can be changed to engage and clamp structural elements having a variety of shapes and sizes. The adjustable clamp 56 includes a plurality of threaded apertures 57 enabling attachment of a quick disconnect, panning ball clamp 54 in a wide range attitudes relative to the structural element engaged by the adjustable clamp. The adaptability of the apparatus is further enhanced by the ability to rotate the quick disconnect panning ball clamp 54 about the longitudinal axis of the housing with the panning base 154 and interconnect articles in different planes by rotating the ball element 150 on an axis that is not parallel to the longitudinal axis of the housing. Once the apparatus has been arranged to interconnect two articles, the articles can be simply and rapidly separated and reattached. For example, the camera-monopod assembly 20 can be interconnected to the structural element 28, as illustrated in FIG. 1, by attaching the panning base 154 of the quick disconnect ball clamp 54 to the adjustable clamp 56. By unlatching and opening the hinged housing segments of the ball clamp, the user can access the panning base screw 218 and thread it into one of the threaded apertures 57 of the adjustable clamp. The ball element 150 can be attached to the monopod collar 52 by removing the ball element from the clamp's housing and engaging one of the threaded apertures 108 in the collar with the ball element screw 172. By manipulating the screw assemblies 74 of the adjustable clamp 50 the structural element is engaged and clamped. The camera-monopod assembly 20 is interconnected to the structural element by locating the ellipsoid first ball portion 156 of the ball element 150 on one of the surfaces 220 defining the ellipsoid socket space in the housing aperture. The ball element is retained in the housing by closing the housing segments 180, 182 and engaging the latch 200. The camera-monopod assembly 20 can be separated from the structure by loosening the latch 200 and moving the assembly with the ball element attached away from the open housing. The camera and monopod can be moved to other positions for use and, if desired, attached to other structural elements or connected to the structural element 28 by placing the ball element 150 in the appropriate location in the open housing and closing and latching the housing segments.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A ball clamp comprising:
    (a) a ball element having at least an ellipsoid portion and a neck portion, wherein said neck portion defines a first aperture extending along a longitudinal axis through said neck portion, and said ellipsoid portion defines a second aperture extending along said longitudinal axis through said ellipsoid portion, such that the first and second apertures form a shoulder at their intersection, said shoulder and said first and second apertures structured to accept a fastening element for attachment to an article;
    (b) a first housing segment including a first interior surface;
    (c) a second housing segment including a second interior surface hingedly connected to said first housing segment, said second housing segment rotatable relative to said first housing segment to a closed position where said first housing segment and said second housing segment define an elongate aperture defined by said first interior surface and said second interior surface including a socket portion arranged to rotatably retain said ellipsoid portion in a manner such that removal of said ball element is prevented when said first and second housing segments are in said closed position, and such that removal of said ellipsoid portion from said socket portion which is otherwise not removable from said first and second housing segments is enabled in an open position; and
    (d) a latch apparatus secured to said first housing segment and engageable with said second housing segment by rotation of said latch apparatus from a first position where said latch apparatus is not within a notch defined by said second housing segment to a second position where said latch apparatus is into said notch defined by said second housing segment to secure said first and second housing segments in said closed position, where a first end of said latch apparatus is secured to said first housing segment when said first housing segment and said second housing segment is in said closed position and when said first housing segment and said second housing segment is in said open position, and a middle portion of said latch apparatus is engaged with said second housing segment when said first housing segment and said second housing segment is in said closed position and said middle portion of said latch apparatus is not engaged with said second housing segment when said first housing segment and said second housing segment is in said open position;

(e) a panning base including a frustoconical surface engageable with a respective conical surface of said first housing segment and said second housing segment for rotation about said longitudinal axis of said elongate aperture.

2. The ball clamp of claim 1 wherein said fastening element is a threaded screw.

3. The ball clamp of claim 2 wherein said first housing segment and said second housing segment in said closed position further define a frustoconical portion of said elongate aperture enabling said ellipsoid portion to be rotated about an axis which is not parallel to said longitudinal axis of said elongate aperture.

4. The ball clamp of claim 2 wherein at least one of said first housing segment and said second housing segment includes an exterior surface and defines a slot connecting said exterior surface and said elongate aperture, said slot arranged to receive an attaching mechanism.

5. A ball clamp comprising:

(a) a ball element having an ellipsoid portion, wherein said ellipsoid portion defines a securement aperture extending along an elongate axis and through said ellipsoid portion, such that said securement aperture defines a shoulder, wherein said securement aperture and shoulder are structured to accept a first attaching mechanism enabling said ball element to be secured to an article;

(b) a panning base having a frustoconical surface and including a second attaching mechanism enabling said panning base to be secured to a second article;

(c) a first housing segment including a first interior surface;

(d) a second housing segment including a second interior surface hingedly connected to said first housing segment, said second housing segment rotatable relative to said first housing segment to a closed position where said first housing segment and said second housing segment define an elongate aperture defined by said first interior surface and said second interior surface including a socket portion arranged to rotatably retain said ellipsoid portion, and said frustoconical surface of said panning base being retained by said first and second housing segments, in a manner such that removal of said ball element from said first housing segment and said second housing segment is prevented in said closed position, said first housing segment and said second housing segment rotatable to open position where said frustoconical surface of said panning base is not retained by either of said first housing segment and said second housing segment and rotatable to said open position enabling removal of said ellipsoid portion from said socket portion which is otherwise not removable from said first and second housing segments without being in said open position; and (e) a latch apparatus secured to said first housing segment and engageable with said second housing segment to secure said housing segments in said closed position.

6. The ball clamp of claim 5 wherein said first housing segment and said second housing segment in said closed position further define a frustoconical portion of said elongate aperture arranged to permit said first attaching mechanism to move when said ellipsoid portion is rotated about an axis which is not parallel to a longitudinal axis of said elongate aperture.

7. The ball clamp of claim 5 wherein at least one of said first housing segment and said second housing segment includes an exterior surface and defines a slot connecting said exterior surface and said elongate aperture, said slot arranged to receive said first attaching mechanism.

* * * * *

UNITED STATES PATENT AND TRADEMARK OFFICE
CERTIFICATE OF CORRECTION

PATENT NO. : 9,958,759 B2
APPLICATION NO. : 13/788480
DATED : May 1, 2018
INVENTOR(S) : Joseph M. Johnson, Sr.

Page 1 of 1

It is certified that error appears in the above-identified patent and that said Letters Patent is hereby corrected as shown below:

In the Specification

Column 2, Line 25: Replace "It so often" with --It is often--;

Column 2, Line 63: After "26 is" delete "a"; and

In the Claims

Column 7, Line 34 (Claim 4): Replace "an" with --said--.

Signed and Sealed this
Twenty-sixth Day of November, 2019

Andrei Iancu
*Director of the United States Patent and Trademark Office*